United States Patent [19]

Sobolev et al.

[11] Patent Number: 4,774,469
[45] Date of Patent: Sep. 27, 1988

[54] METHOD OF DETERMINING THE MINERAL COMPOSITION OF ORE BODIES IN ROCK MASS

[75] Inventors: Gennady A. Sobolev; Vladislav M. Demin; Vladimir F. Los; Zinovy-Jury Y. Maibuk, all of Moscow, U.S.S.R.

[73] Assignee: Institut Fiziki Zemli Imeni Shmidta an SSSR, Moscow, U.S.S.R.

[21] Appl. No.: 923,151
[22] PCT Filed: Jan. 5, 1985
[86] PCT No.: PCT/SU85/00001
  § 371 Date: Sep. 2, 1986
  § 102(e) Date: Sep. 2, 1986
[87] PCT Pub. No.: WO86/04154
  PCT Pub. Date: Jul. 17, 1986

[51] Int. Cl.$^4$ .............................................. G01V 11/00
[52] U.S. Cl. ....................................... 324/323; 324/344; 367/14
[58] Field of Search ............... 324/323, 334, 336, 337, 324/344, 345; 367/14, 21, 41

[56] References Cited

U.S. PATENT DOCUMENTS

| | | | |
|---|---|---|---|
| 3,392,327 | 7/1968 | Zimmerman, Jr. | 324/323 X |
| 3,524,129 | 8/1970 | Ikrath | 324/323 |
| 3,621,380 | 11/1971 | Barlow, Jr. | 324/345 |
| 3,975,674 | 8/1976 | McEuen | 324/323 X |
| 4,504,833 | 3/1985 | Fowler et al. | 324/337 X |

FOREIGN PATENT DOCUMENTS 330411 7/1972 U.S.S.R. .
771595 10/1980 U.S.S.R. .
890349 12/1981 U.S.S.R. .
1041973 9/1983 U.S.S.R. .

OTHER PUBLICATIONS

M. P. Volarovich et al., Piezoelectric Method of Geophysical Prospecting of Quartz and Pegmatite Veins, 1969, Nauka Publ., Moscow, pp. 65–71.
E. I. Parkhomenko, Electrization Effects in Rock, 1968, Nauka Publ., Moscow, pp. 228–237.

Primary Examiner—Reinhard J. Eisenzopf
Assistant Examiner—Warren S. Edmonds
Attorney, Agent, or Firm—Lilling & Greenspan

[57] ABSTRACT

The method of geophysical prospecting of polymineral ore bodies including registering pulsed electromagnetic radiation generated by the ore bodies under the action of elastic waves excited in the rock block. The radiation is registered as pulse bursts, each burst corresponding to one ore body. The shape of a pulse corresponding to the ore body under investigation is compared with the shapes of pulses corresponding to ore bodies of the known mineral compositions, and one similar pulse is selected from these pulses. Then a pulse from the burst corresponding to the ore body under investigation is subjected to the Fourier transformation to obtain the pulse height-frequency spectrum of this pulse, which is compared with the pulse height-frequency spectrum of the selected pulse, and when at least two frequencies of the maximums of the amplitudes of these respective spectra coincide, there is established correspondence between the mineral compositions of the known ore body and of the ore body under investigation.

4 Claims, 2 Drawing Sheets

METHOD OF DETERMINING THE MINERAL COMPOSITION OF ORE BODIES IN ROCK MASS

BACKGROUND OF THE INVENTION

1. Field of the Invention

The invention relates to geophysics, namely, to methods of locating useful minerals by seismic prospecting and prospecting by electromagnetic waves, and more particularly it relates to geophysical prospecting of polymineral ore bodies.

2. Description of the Prior Art

Ore bodies in different deposits, and even within a single deposit, may differ broadly in their mineral composition. In any deposit, only those ore bodies which contain a substantial percentage of the useful mineral or a combination of several useful or valuable minerals are of commercial attraction. Hence, the determination of the mineral composition of ore bodies represents an essential aspect of geophysical prospecting.

Conventionally, the determination of the mineral composition of ore bodies has been conducted by a geological technique including drilling a network of holes through a deposit and assessing the contents of the ore bodies traversed by the holes by analysis of core samples taken therefrom. However, as the mineral composition of ore bodies tends to vary even within one and the same ore body, it becomes necessary to drill multiple holes to adequately evaluate the feasibility of opening up this or that ore body by mine workings and its full-scale mining. This geological approach is relatively time- and labor-consuming and costly, and even then it is not sufficiently effective, for each single hole supplies data on the composition of the ore body within a very limited area, more often than not only a few centimeters in diameter, which does not permit assessment with appropriate accuracy of the average composition of the ore body and the total amount of a valuable mineral contained therein.

There are also known several geophysical methods of evaluating the mineral composition of polymineral ore bodies. There is known a contact method of polarization curves (cf., Y.S. Ryss, Prospecting of Ore Bodies by Contact Method of Polarization Curves, in Russian, published in 1973 by NEDRA Publ., Leningrad, p. 167) based on connecting one pole of an electric current source to a point of the ore body in a hole or in a mine working, and connecting the other pole of the same source to an electrode embedded in the parent rock, whereafter the electric current is made to flow through the circuit thus formed, the value of this current being gradually raised. Various minerals contained in the ore body under investigation enter electrochemical reactions at different values of the flowing current, so that the value of the registered potential varies in steps. The values of the potentials of the electrochemical reactions are compared with reference values obtained in advance in a laboratory environment and represent the presence in the ore body of a known mineral. Thus, when the registered potential values coincide with the reference ones, a conclusion can be made on the actual presence of the corresponding mineral in the ore body. In this way the mineral composition of the ore body under investigation is analyzed; whereas the threshold values of the electric current are used for assessing the quantitative composition of the minerals and the approximate scale of the ore deposit, as part of the phase of evaluating detected ore manifestations. However, this method involves numerous technical and practical difficulties arising from the complexity of selecting a reliable spot of contact with the ore body, from large values of the electric current required (as big as several dozen to several hundred Amperes). Moreover, the time taken to obtain a single polarization curve is from several dozen minutes to several days, so that one contact session with the ore body usually consumes a number of working days. It can be seen from the above that the employment of this method in an underground mine environment is severely hindered.

The abovedescribed method does not allow prospecting for an ore body unless the latter is pierced by holes or mine workings requiring as it does a direct contact with the ore. Neither is it operable for simultaneously studying several ore bodies, particularly those adjoining one another.

There further exist geophysical methods of propsecting for polymineral ore bodies without traversing them by holes or exploration workings, providing for substantial economy of both time and costs in exploring ore bodies for assessing the feasibility of their full-scale mining.

There is known a method of geophysical prospecting for polymineral ore bodies (of. the USSR Inventor's Certificate No. 330,411; Int.Cl. G 01 V 11/00, published in "Discoveris, Inventions, Industrial Designs, Trademarks" Gazette on Feb. 24, 1972) employed for detecting pockets of piezo-optical quarts. The method includes exciting elastic waves in the rock block housing the ore bodies, registering the electromagnetic pulsed radiation generated by the ore bodies under the action of these elastic waves in the form of pulse bursts, each burst corresponding to one ore body, subjecting to Fourier transform a pulse from the pulse burst corresponding to the ore body under investigation to obtain the pulse height-frequency spectrum of the pulse of the electromagnetic radiation, and carrying information on the mineral composition of the investigated ore body.

There is also produced the amplitude-frequency spectrum of the elastic wave in the range to 30 kHz, whereafter the two spectra are transformed to the same maximum amplitude, the spectrum of the elastic wave is subtracted from the spectrum of the electromagnetic radiation pulse, and the absence or presence in this differential spectrum of the high-frequency portion (to 30 kHz) is considered as an evidence, respectively, of the absence or presence of a piezo-optical quartz pocket in the ore body.

Quartz crystals generate electromagnetic signals only when the amplitude-frequency spectrum of the initiating elastic wave includes frequencies corresponding to the resonance frequencies of quartz crystals. However, due to absorption of the high-frequency part of the elastic wave spectrum, signals in the vicinity and above 30 kHz would not be registered at distances in excess of 20–30 m from the wave source, whereby this known method is impractical for employment for determination of the mineral composition of polymineral ore bodies at distances in excess of 30 meters.

Moreover, the described method of geophysical prospecting for polymineral ore bodies can be used exclusively for detecting quartz crystals and is not suited for determining the mineral composition of complex ore bodies incapable of the piezoelectric effect.

SUMMARY OF THE INVENTION

It is an object of the present invention to provide a method of geophysical prospecting for polymineral ore bodies, allowing for determination of the mineral composition of an ore body, under investigation, embedded in an explored rock block.

This object is attained in a method of geophysical prospecting for polymineral ore bodies, which includes exciting elastic waves in the rock block housing the ore bodies, registering the pulsed electromagnetic radiation generated by the ore bodies under the action of these elastic waves in the form of pulse bursts corresponding each to one ore body, performing a Fourier transform with a pulse from the pulse burst corresponding to the body under investigation, to obtain the height-frequency spectrum of this pulse, and carrying information on the mineral composition of the ore body under investigation. The method, in accordance with the present invention, following the registration of the radiation, includes the step of comparing the shape of a pulse from the burst corresponding to the ore body under investigation with pulses corresponding to ore bodies of the known mineral compositions, a similar pulse being selected therefrom, and the pulse height-frequency spectrum of the pulse generated by the ore body under investigation is compared with the pulse heightfrequency spectrum of the selected pulse, wherein the maximum pulse heights at the corresponding frequencies are representative of the mineral composition of the ore body, and upon coincidence of at least two frequencies of the maximum pulse heights there is established the correspondence between the mineral compositions, respectively, of the ore body under investigation and of the known ore body.

It is known that when a polymineral ore body is excited by elastic waves in the sonic range, this ore body generates pulsed electromagnetic radiation in the range of frequencies from several kiloherts to several megahertz. The power of this radiaton is hundreds to thousands times greater than the power of signals of piezoelectric origin, and this radiation is emitted by ore bodies containing piezoelectric and semiconductor substances.

Experimental studies conducted at various mineral deposits have shown that the pulse height-frequency spectra of pulses coming from ore bodies of different mineral compositions substantially differ from one another, whereas the spectra of the ore bodies of the same composition have the maximum pulse heights at the same frequencies, which are at least three times as great as the noise level.

Thus, the disclosed method of geophysical prospecting for polymineral ore bodies provides for conducting sufficiently swift, in most cases within a single day, and with appropriate accuracy, the determination of the mineral composition of a polymineral ore body untraversed by a hole or a mine working, allowing for assessing the feasibility of its full-scale mining. The radius of a rock block that can be investigated is within several hundred to several thousand meters from the point of excitation of the elastic waves.

As compared with known geological methods allowing for determination of the mineral composition of polymineral ore bodies, the herein disclosed method of geophysical survey of polymineral ore bodies requires substantially less expenditure of time and resources.

BRIEF DESCRIPTION OF THE DRAWINGS.

The invention will be further described in connection with implementation of the method of geophysical prospecting for polymineral ore bodies and accompanying drawings, wherein.

DESCRIPTION OF THE PREFERRED METHOD

The herein disclosed method of geophysical prospecting for a polymineral ore body is conducted, as follows.

Elastic waves are excited in a rock block under investigation to induce pulsed electromagnetic radiation in the frequency range from several kilohertz to several megahertz. This is accomplished by exploding an explosive charge, the power of the explosion being suited to the volume of the rock block under investigation.

In most cases the disclosed method should be employed for exploring a rock block within a radius of about 100 m from the point of explosion. The explosive charge is also selected with provisions for the propagation conditions of elastic waves in the rock block under investigation and for the mineral composition expected in the ore bodies.

Thus, in most cases the mass of the explosive charge, e.g. ammonite is within 6 kg. In cases when the rock block to be investigated is relatively small, e.g. from 10 to 20 m, non-explosive source of elastic waves can be used. The explosive charge is usually positioned at the mouth of an existing hole, or in a cavity made in the floor of a mine working. The pulsed electromagnetic radiation generated by the ore bodies under the action of the elastic waves is registered in the form of pulse bursts, each burst corresponding to one ore body.

The equipment for receiving and registering the electromagnetic pulses generated by the ore bodies can be accommodated in any mine working in the proximity of the rock body under exploration, in most cases within 400 m from the point of explosion.

Figure 2:
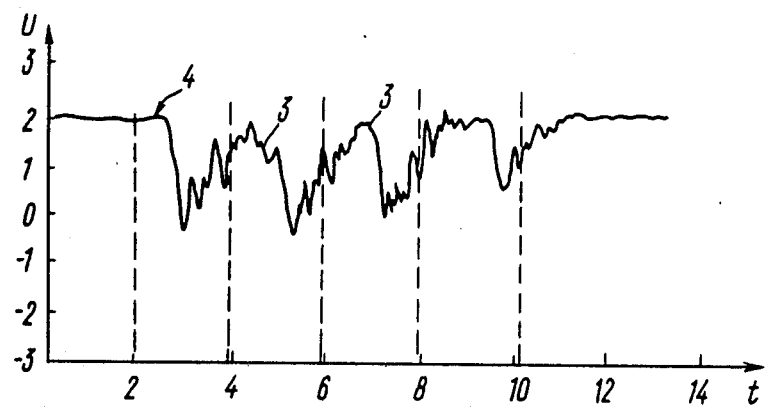
FIG. 2 shows a time-related chart of the pulsed electromagnetic radiation of an ore body of the known mineral composition including cinnabar.
Figure 1:
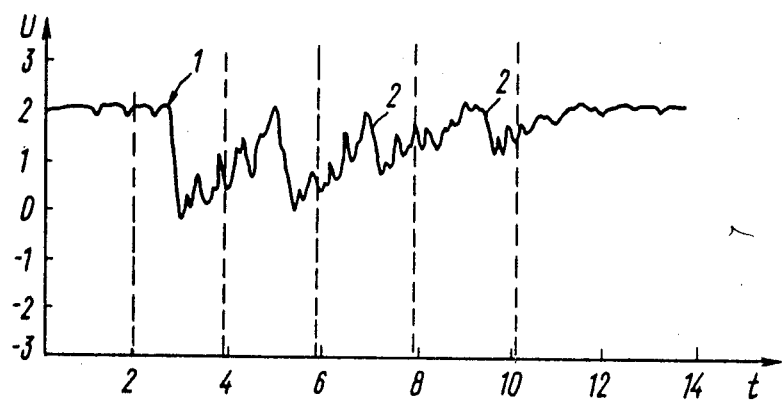
FIG. 1 shows a time-related chart of the pulsed electromagnetic radiation of an ore body under investigation, according to the invention.

As it has been already mentioned, the electromagnetic radiation of ore bodies is in the form of bursts of short-duration pulses (1–10 $\mu s$) of different heights and polarity, the pulses within a single burst, corresponding to one ore body, having the same polarity and the same shape, as each single one of the pulses represents the mineral composition of this ore body. The time-related chart in FIG. 1 shows the pulsed electromagnetic radiation of an investigated ore body including a burst 1 of four pulses 2 whose shape is basically indentical. The Y-axis represents the voltage U at the output of the registering device, V, and the X-axis represents time "t" in microseconds. The shape of one of the pulses 2 is compared with the shape of the pulses generated by an ore body of the known mineral composition. The comparison results in the selection of one pulse 3 (FIG. 2)

from a burst 4 of pulses corresponding to the ore body whose composition is known. FIG. 2 of the appended drawings shows this burst 4 including four pulses 3. Here, too, the Y-axis represents the voltage U measured in volts, V, at the output of the registering device, while the X-axis represents time "t" in $\mu s$.

Then with the pulse 2 (FIG. 1) of the ore body under investigation there is performed the known Fourier transform, obtaining a pulse- height-frequency spectrum of the pulse 2 of the electromagnetic radiation, in the form of a curve 5 (FIG. 3), The pulse height-frequency spectrum is shown in this chart within the frequency range from 60 kHz to 3.5 MHz, with the X-axis representing the frequency "f", MHz, and the Y-axis representing the spectral density S(f) in fractions of a unit, the unit being the height or magnitude of the spectral density of the main maximum of the pulse height-frequency spectrum. The curve 5 displays two maximums $M_1$ and $M_2$, respectively, at frequencies $f_1$ and $f_2$, whose values or heights are at least three times as great as $\sigma_1$ - the mean-square value of the noise level.

Figure 4:
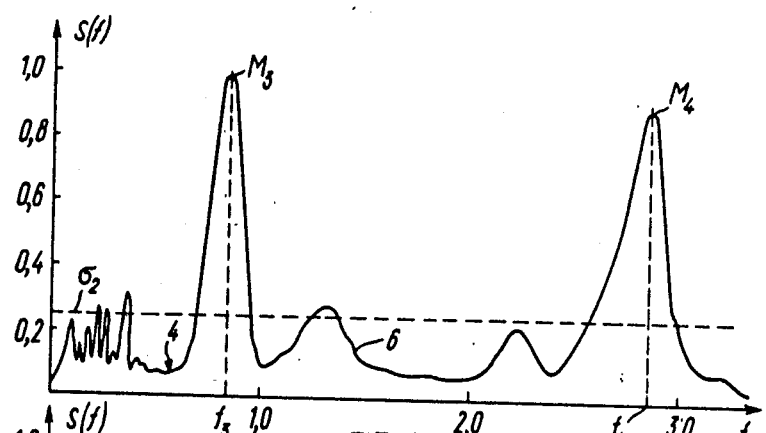
FIG. 4 shows the pulse height-frequency spectrum of an electromagnetic pulse of the ore body of the known mineral composition including cinnabar.

Then the curve 5 of the pulse height-frequency spectrum of the pulse 2 of the ore body under investigation is compared with the pulse height-frequency spectrum of the pulse 3 (FIG. 2) of the known ore body, illustrated by a curve 6 in FIG. 4. This last-mentioned pulse height-amplitude spectrum is likewise shown in this chart in the frequency range from 60 kHz to 3.5 MHz, the X-axis representing the frequency "f" in MHz, and the Y-axis representing the spectral density S(f). The mineral composition of the known ore body is characterized by the presence in its pulse height-frequency spectrum of two maximums $M_3$ and $M_4$ surpassing the noise level at least three times, respectively, at frequencies $f_3$ and $f_4$. Should the frequencies $f_1$ of the maximum $M_1$ and $f_2$ of the maximum $M_2$ coincide, respectively, with the frequencies $f_3$ and $f_4$ of the maximums $M_3$ and $M_4$, a conclusion is drawn that the mineral compositions of the investigated and known ore bodies correspond to each other.

If the frequencies $f_1$ and $f_2$ fail to coincide with the respective frequencies $f_3$ and $f_4$, the conclusion drawn is that the mineral compositions of the investigated and known ore bodies are different, and the pulses are further analyzed in the abovedescribed procedure.

For better comprehension of the method of geophysical survey of polymineral ore bodies, given below are examples of its implementation.

EXAMPLE 1

Geophysical survey was conducted at a polymineral ore deposit with the aim of determining the mineral composition of ore bodies embedded in limestone. Following the explosion of a 3 kg charge of ammonite in a drift, there was registered as a time-related chart the burst 1 (FIG. 1) of electromagnetic pulses 2. The receiving equipment was positioned at a 155 m distance from the explosion spot. The distance from the explosion spot and the investigated ore body of unknown mineral composition was calculated from the time of arrival of the pulse burst in the time-related chart, and found to be 40 m. Pulses 2 in the time-related chart are characterized by the unipolar shape with the steep onset and gradual fading against the background of discernible high-frequency oscillations. The height or amplitude of the first pulse 2 was the greatest and attained the magnitude of 2.2V at the output of the registering apparatus. The height of the successive pulses 2 was gradually declining with respect to the height of the first pulse 2.

The shape of the registered electromagnetic pulses 2 was compared with the shapes of pulses recorded from ore bodies of known mineral compositions. It was found to resemble the most the shape of pulses 3 (FIG. 2) recorded from an ore body traversed by multiple drifts and containing cinnabar—a valuable mineral.

Figure 3:
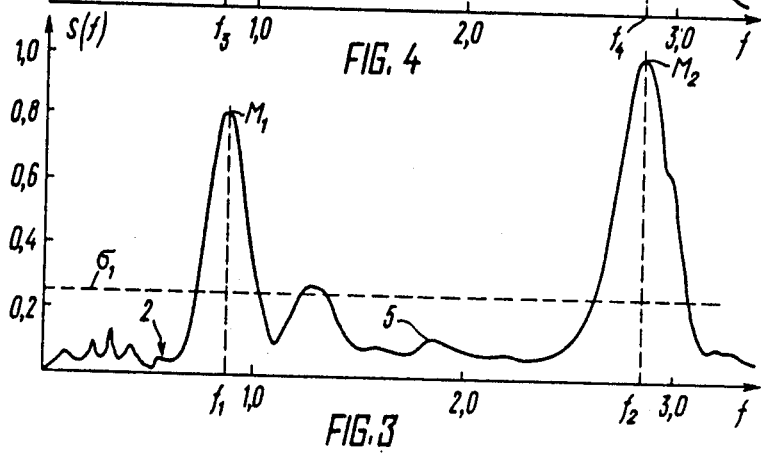
FIG. 3 shows the pulse height-frequency spectrum of an electromagnetic pulse generated by the investigated ore body within the 60 kHz to 3.5 mHz frequency range, according to the invention.

Then the pulses 2 of the ore body under investigation were subjected to the Fourier transform that yielded their pulse height-frequency spectra represented by the curve 5 (FIG. 3). Two maximums $M_1$ and $M_2$ can be seen in the spectrum, their magnitudes being more than three times that of the mean square value of the noise level $\sigma_1=0.253$. The maximum $M_1$ corresponds to the 0.85 MHz frequency $f_1$ and is characterized by the ratio of the height of its spectral density $S(f_1)$ to the noise amplitude $\sigma_1$ equalling 3.2:1. The second maximum $M_2$ corresponds to the 2.8 MHz frequency $f_2$ and is characterized by the ratio of the height of its spectral density to the noise level $S(f_2)$: $\sigma_1=3.95$. The amplitude of other maximums appearing in the spectrum does not exceed 1.1 of the noise level.

This pulse height-frequency spectrum (the curve 5 in FIG. 3) of the ore body of unknown composition was compared with the pulse height-frequency spectrum (the curve 6 in FIG. 4) of an ore body of the known mineral composition including cinnabar. The pulse height-frequency spectrum of the ore body of the known mineral composition likewise features two significant maximums. The maximum $M_3$ at the frequency $f_3=0.85$ MHz is characterized by the ratio of its height to the noise level $\sigma_1=0.251$ equalling $S(f_3)$: $\sigma_1=4.0:1$. The maximum $M_4$ corresponds to the frequency $f_4=2.8$ MHz and is characterized by the ratio of its height to the noise level $S(f_4)$: $\sigma_1=3.6:1$. The rest of the maximum in the pulse height-frequency spectrum of the ore body of the known mineral composition do not exceed the noise level more than 1.25 times.

As the respective frequencies $f_1$ and $f_2$ of the maximums $M_1$ and $M_2$ coincided with the frequencies $f_3$ and $f_4$ of the maximums $M_3$ and $M_4$, the conclusion had been drawn that the ore body under investigation contains cinnabar. The outcome of this geophysical survey was later corroborated by the drilling of two holes that traversed the ore body and proved that the latter contained cinnabar in the quantity that warranted its full-scale mining.

EXAMPLE 2

Geophysical survey was conducted at a polymineral ore deposit having ore bodies embedded in a block of clay-carbonaceous shale. Explosion of 2 kg and 6 kg charges of ammonite yielded nine bursts of pulses of electromagnetic radiation from nine are bodies spaced from the respective explosion spots by 30 to 120 m. The distance of the receiving equipment from the spots of explosion was 140-160 m.

The shapes of the pulses of the registered electromagnetic signals (not shown) suggested that they should be broken down into two groups. The first group was represented by a single pulse burst corresponding to one ore body of unknown composition. The pulses in this burst were characterized by a bipolar shape with sharp onset and gradual relaxation of the signal against the background of high-frequency oscillations. The second group embraced the eight remaining pulse bursts from the eight ore bodies of unknown compositions. The electromagnetic pulses in these bursts were characterized by a quasisinusoidal shape with smooth rises and declines of the signal amplitudes.

The pulses from the ore bodies of unknown compositions were compared with the shapes of pulses generated by ore bodies with known compositions. The pulses of the first burst from the first-mentioned single ore body had their shapes resembling these of pulses generated by ore bodies of the sphalerite-galenite composition which warranted commercial interest. The comparison of the pulse height-frequency spectra of the pulses from the ore body under investigation and from the ore body of the known composition showed that both spectra contained the maximums at 0.35 MHz, 1.8 MHz and 2.4 MHz frequencies whose magnitudes were more than 3 times as great as the noise level. This comparison of the shapes and pulse height-frequency spectra of the electromagnetic pulses suggested that the ore body under investigation had a sphaleritegalenite composition and warranted full-scale mining.

The shape of the electromagnetic pulses from the eight remaining ore bodies of unknown compositions coincided with the shape of the pulses generated by ore bodies of the known, predominantly pyrite composition containing less than 5% sphalerite, which were not considered commercially attractive. The comparison of the pulse height-frequency spectra of the pulses from the ore bodies of unknown compositions with the spectra from the ore bodies of the predominantly pyrite composition showed that both spectra contained the maximums at 0.09 MHz, 0.15 MHz, 1.3 MHz and 2.2 MHz frequencies, whose magnitudes were more than 3 times as great as the noise level. The comparison of the shapes and pulse height-frequency spectra gave rise to a conclusion that the eight detected bodies had a predominantly pyrite composition and not warranted full-scale mining. Thus, the employment of the herein disclosed method of geophysical survey has allowed determination of the mineral composition of the ore bodies with a modest input of time and cost, and classification of the ore bodies under investigation into those warranting and not warranting further mining.

The method of geophysical prospecting of polymineral ore bodies is intended for the phases of exploration and prospecting for ore bodies containing antimony, lead, gold, zinc, mercury, molybdenum, tungsten, tin, rare-earth metals.

What is claimed is:

1. A method of determing the mineral composition of ore bodies in a rock mass comprising the steps of:
   (a) establishing reference or standard pulse bursts of ore bodies having known mineral composition;
   (b) exciting elastic waves in the rock housing the ore bodies to cause the ore bodies to generate pulsed electromagnetic radio waves range radiation in the form of pulse bursts;
   (c) registering the pulsed bursts of electromagnetic radio waves range radiation generated by the ore bodies under the action of the elastic waves, each of said pulse bursts corresponding to one ore body;
   (d) selecting one registered pulse burst and comparing the shape of said pulse burst with the shape of pulse bursts included in the reference or standard pulse bursts of ore bodies having known mineral composition, and, as a result of such comparison, selecting one pulse out of said reference or standard pulse bursts;
   (e) subjecting the pulse burst of the ore body under investigation to an amplitude-frequency spectrum analysis; and
   (f) comparing the obtained amplitude-frequency spectrum of the ore body under investigation with the amplitude-frequency spectrum of the selected reference or standard pulse burst and upon coincidence of at least two frequency maximums of the amplitude frequency spectra of the pulse burst under investigation and of the reference or standard pulse burst to establish a correspondence between the mineral composition of the ore body under investigation and the known ore body.

2. A method as defined in claim 1, wherein the amplitude-frequency spectrum analysis comprises subjecting the pulse burst under investigation to a Fourier transformation.

3. A method as defined in claim 1, wherein the method is carried out within the range of 30 kHz to 3.5 MHz.

4. A method as defined in claim 3, wherein the method is carried out within the range of 60 kHz to 3 MHz.

* * * * *